(12) United States Patent
Kahle et al.

(10) Patent No.: US 10,339,670 B2
(45) Date of Patent: Jul. 2, 2019

(54) 3D TOOL TRACKING AND POSITIONING USING CAMERAS

(71) Applicant: Trimble Inc., Sunnyvale, CA (US)

(72) Inventors: Kent Kahle, Hayward, CA (US); Changlin Xiao, Sichuan (CN)

(73) Assignee: Trimble Inc., Sunnyvale, CA (US)

( * ) Notice: Subject to any disclaimer, the term of this patent is extended or adjusted under 35 U.S.C. 154(b) by 85 days.

(21) Appl. No.: 15/689,514

(22) Filed: Aug. 29, 2017

(65) Prior Publication Data

US 2019/0066331 A1    Feb. 28, 2019

(51) Int. Cl.
| | | |
|---|---|---|
| *G06T 7/73* | (2017.01) |
| *G06T 7/11* | (2017.01) |
| *G06T 7/292* | (2017.01) |
| *G06T 7/246* | (2017.01) |
| *B25F 5/00* | (2006.01) |
| *G06K 9/00* | (2006.01) |
| *G06K 9/46* | (2006.01) |
| *G06K 9/62* | (2006.01) |

(52) U.S. Cl.
CPC ............... *G06T 7/74* (2017.01); *B25F 5/00* (2013.01); *G06K 9/00201* (2013.01); *G06K 9/4628* (2013.01); *G06K 9/6271* (2013.01); *G06T 7/11* (2017.01); *G06T 7/248* (2017.01); *G06T 7/292* (2017.01); *G06T 2200/04* (2013.01); *G06T 2207/10028* (2013.01); *G06T 2207/20021* (2013.01); *G06T 2207/20081* (2013.01); *G06T 2207/30196* (2013.01); *G06T 2207/30232* (2013.01)

(58) Field of Classification Search
CPC combination set(s) only.
See application file for complete search history.

(56) References Cited

U.S. PATENT DOCUMENTS

| | | | |
|---|---|---|---|
| 2,685,082 A | 7/1954 | Beman et al. |
| 2,966,090 A | 12/1960 | Schöldström |
| 5,926,260 A | 7/1999 | Dunne et al. |
| 6,064,398 A | 5/2000 | Ellenby et al. |
| 6,097,429 A * | 8/2000 | Seeley ............. G08B 13/19602 |
| | | | 348/154 |

(Continued)

FOREIGN PATENT DOCUMENTS

| | | |
|---|---|---|
| DE | 10 2013 211 930 A1 | 1/2014 |
| EP | 2 116 919 A1 | 11/2009 |

(Continued)

OTHER PUBLICATIONS

"Grade Control for Dozers," Civil Engineering and Construction, downloaded from http://construction.trimble.com/products-and-solutions/grade-control-dozers, 2 pages.

(Continued)

*Primary Examiner* — Anand P Bhatnagar
(74) *Attorney, Agent, or Firm* — Kilpatrick Townsend & Stockton LLP

(57) ABSTRACT

A tool in a scene is detected using one or more cameras by dividing an image into patches. Multiple different patch sizes are used in conjunction with deep learning to identify the tool in the image. After the tool is identified, a position of the tool in three dimensions is calculated using images from two or more cameras.

20 Claims, 10 Drawing Sheets

(56) References Cited

U.S. PATENT DOCUMENTS

| | | | |
|---|---|---|---|
| 6,697,147 B2 | 2/2004 | Ko et al. | |
| 6,919,880 B2 | 7/2005 | Morrison et al. | |
| 7,180,014 B2* | 2/2007 | Farber | G16H 40/20 |
| | | | 177/25.19 |
| 7,215,364 B2 | 5/2007 | Wachtel et al. | |
| 8,350,908 B2* | 1/2013 | Morris | G06K 9/00295 |
| | | | 348/143 |
| 8,874,406 B2 | 10/2014 | Røtvold et al. | |
| 9,064,172 B2* | 6/2015 | Jia | G06K 9/00241 |
| 9,305,216 B1* | 4/2016 | Mishra | G06F 16/50 |
| 9,836,890 B2* | 12/2017 | Jurgenson | G06T 19/006 |
| 9,968,256 B2* | 5/2018 | Tolkowsky | G06T 5/003 |
| 10,061,323 B2* | 8/2018 | Muck | G05D 1/0246 |
| 10,147,236 B2* | 12/2018 | Grossman | G06T 19/006 |
| 2006/0174302 A1* | 8/2006 | Mattern | H04N 7/18 |
| | | | 725/105 |
| 2006/0271298 A1 | 11/2006 | MacIntosh et al. | |
| 2008/0211915 A1 | 9/2008 | McCubbrey | |
| 2008/0240616 A1* | 10/2008 | Haering | G06K 9/00771 |
| | | | 382/294 |
| 2009/0088634 A1* | 4/2009 | Zhao | B25J 9/1689 |
| | | | 600/427 |
| 2009/0088773 A1* | 4/2009 | Zhao | G06K 9/3241 |
| | | | 606/130 |
| 2010/0080415 A1* | 4/2010 | Qureshi | G06T 7/246 |
| | | | 382/103 |
| 2010/0092038 A1 | 4/2010 | Theodore et al. | |
| 2010/0183422 A1 | 7/2010 | Mäkelä et al. | |
| 2011/0044545 A1 | 2/2011 | Jessen et al. | |
| 2011/0115909 A1* | 5/2011 | Sternberg | G01S 3/7864 |
| | | | 348/143 |
| 2012/0303336 A1 | 11/2012 | Becker et al. | |
| 2013/0103179 A1* | 4/2013 | Miyoshi | B25J 9/1679 |
| | | | 700/112 |
| 2013/0265421 A1* | 10/2013 | Jia | G06K 9/00241 |
| | | | 348/143 |
| 2014/0111541 A1* | 4/2014 | Tolkowsky | A61B 5/0044 |
| | | | 345/632 |
| 2014/0218612 A1 | 8/2014 | Belsarkar | |
| 2014/0237685 A1* | 8/2014 | Fu | C07K 14/415 |
| | | | 800/286 |
| 2014/0267685 A1 | 9/2014 | Kahle et al. | |
| 2016/0283823 A1* | 9/2016 | Bartley | G06F 16/29 |
| 2016/0321815 A1* | 11/2016 | Bartley | G06F 16/29 |
| 2018/0247483 A1* | 8/2018 | Lindsay | G06F 21/31 |

FOREIGN PATENT DOCUMENTS

| | | |
|---|---|---|
| FR | 2 630 538 A1 | 10/1989 |
| KR | 2015 0114088 A | 10/2015 |
| WO | 2010/148526 A1 | 12/2010 |
| WO | 2016/100814 A1 | 6/2016 |

OTHER PUBLICATIONS

"Trimble Total Stations," Transforming the Way the World Works, downloaded from http://trl.trimble.com/docushare/dsweb/Get/Document-752084/022516-168B_Trimble_S-Series_TS_BRO_US_0416_LR.pdf, 16 pages.

Kan, Z. "Vision-Based Estimation and Control," downloaded from https://sites.google.com/site/kanzhen0322/reserach/vision, 4 pages.

"eCAMSECURE," Commercial Security Systems, Video Monitoring, downloaded from https://www.ecamsecure.com/, 4 pages.

* cited by examiner

3D TOOL TRACKING AND POSITIONING USING CAMERAS

CROSS-REFERENCE TO RELATED APPLICATIONS

This application is related to the following applications, the disclosures of each are incorporated by reference into this application for all purposes: application Ser. No. 15/604,169, filed May 24, 2017, entitled "Infrastructure Positioning Camera System"; application Ser. No. 15/604,161, filed May 24, 2017, entitled "Calibration Approach for Camera Placement"; and application Ser. No. 15/604,172, filed May 24, 2017, entitled "Measurement, Layout, Marking, Firestop Stick."

BACKGROUND

This disclosure relates to systems and methods that facilitate positioning points and objects in a work space or at a worksite, such as for example at a construction site. When an interior of a building is being finished, connectors, anchors, and the like are attached to the floors, ceilings and other structures in the building, and cuts are made and holes drilled using power saws and drills. Many tasks are accomplished using special power tools at predetermined locations, such that the tools are operated at numerous, precisely-defined positions in the building. For example, nail guns, power saws, power-anchor tools, and the like are used to nail, cut, install fasteners, and perform other operations at predetermined points within the building. In a building, a large number of electrical, plumbing, and HVAC components are properly sited and installed, usually with power tools. Additionally, finishing a building interior also uses a number of different tools that are not powered, yet are to be operated at precisely defined positions, such as for example reinforcement bar scanners. Positioning both power tools and non-power tools is to be accomplished quickly and with some precision with respect to the surrounding walls, ceilings, and floors as they are roughed in. Typically, it has used a significant amount of labor to lay out various construction points at a construction site. Teams of workers have been used to measure and mark predetermined locations. It will be appreciated that this process has been subject to errors, resulting from measurement mistakes and from accumulated errors. Further, the cost of this layout process and the time needed to perform the layout process have both been significant.

Various location determining systems, including systems that incorporate one or more robotic total stations, have been used for building layout. The total station in such a system, positioned at a fixed, known location, directs a beam of laser light at a retro-reflective target. As the target moves, robotics in the total station cause the beam of light to track the target. Since the dimensional coordinates of the total station are known, the dimensional coordinates of the retro-reflective target can be determined. Based on the measured position of the retro-reflective target, and the desired position of some building feature, such as a drilled hole and/or a fastener, the operator can move the reflector to the desired position, and mark the position.

Although position determination systems, such as ranging radio systems and robotic total station systems, can facilitate and speed the layout process, the layout process has continued to be lengthy, tedious, and expensive. Previous applications have been filed addressing systems and/or methods to reduce construction expense and/or labor. For example, U.S. patent application Ser. No. 13/800,350, filed Mar. 13, 2013, which is incorporated by reference, provides systems and methods for positioning a tool in a work space.

BRIEF SUMMARY

Multiple cameras are used to track a target (e.g., a tool, such as a drill) at a worksite. Current tracking algorithms (e.g., scale-invariant feature transform (SIFT) and histogram of oriented gradients (HOG)) are typically vulnerable to noise and cluttered backgrounds, which limits their use in practical environments. Deep learning has become more reliable, yet deep learning has difficulty in identifying objects of different sizes. In some embodiments, different sizes of patches of an image are used to identify objects. A patch is a two-dimensional area of an image. A computer neural network is trained to identify an object. Training is performed without changing a scale of the object. To detect the object at a worksite, a camera acquires an image of a scene with the object in the scene. The object could be close to the camera or far from the camera, making it difficult for the computer neural network to identify the object in the image, since the computer neural network was trained to detect the object without changing the scale of the object. In some embodiments, the image is divided into smaller and smaller patches, and object detection is performed on the patches, until the object is found (and/or until a minimum patch size is reached). For example, the image is divided into a first number of patches (e.g., 4, 9, 16, 25, and/or 36 patches) to generate a first set of patches. The computer neural network reviews the first set of patches. If the object is not detected in the first set of patches, the image is divided into a second number of patches (e.g., 25, 30, 36, 56, 64, 81, and/or 100 patches) to generate a second set of patches. The computer neural network reviews the second set of patches. If the object is not detected in the second set of patches, the image is divided into a third number of patches (e.g., 256, 1024, and/or 4096 patches) to generate a third set of patches. The computer neural network then reviews the third set of patches for the object. The number of patches keeps increasing until the object is identified and/or a minimum patch size is reached (e.g., a minimum patch size is 10 pixels×10 pixels).

In some embodiments, a system for detecting a tool in a scene comprises: a camera unit for acquiring an image of a scene; and one or more processors configured to: divide the image into a first number of patches to generate a first set of patches, wherein a patch is an area of the image, perform object detection on the first set of patches to identify the tool in a patch of the first set of patches, determine that the tool is not detected in the first set of patches, divide the image into a second number of patches to generate a second set of patches, after determining that the tool is not detected in the first set of patches, perform object detection on the second set of patches to identify the tool in a patch of the second set of patches, and/or determine that the tool is detected in a patch of the second set of patches. In some embodiments, the camera unit is a first camera unit, the one or more processors is a first processor unit, the image is a first image, and/or the system further comprises: a second camera unit configured to acquire a second image, and/or a second processor unit configured to determine a position of the tool in three dimensions based on the first image and the second image. In some embodiments, the system further comprises a display, and the one or more processors is further configured to display an indication of the tool overlaying an image on the display; and/or the indication of the tool is a heat map.

In some embodiments, a method for detecting a tool in a scene comprises acquiring an image of the scene; dividing the image into a first number of patches to generate a first set of patches, wherein a patch is an area of the image; performing object detection on the first set of patches to identify the tool in a patch of the first set of patches; determining that the tool is not detected in the first set of patches; dividing the image into a second number of patches to generate a second set of patches, after determining that the tool is not detected in the first set of patches; performing object detection on the second set of patches to identify the tool in a patch of the second set of patches; and/or determining that the tool is detected in a patch of the second set of patches. In some embodiments, the method comprises dividing the image into a third number of patches to generate a third set of patches, after determining that the tool is not detected in the first set of patches and before dividing the image into a second number of patches; performing object detection on the third set of patches to identify the tool in a patch of the third set of patches; determining that the tool is not detected in the third set of patches; calculating a three-dimensional position of the tool based on the image from a first camera unit, wherein the image is a first image, and a second image from a second camera unit; training a computer neural network to identify the tool before acquiring the image of the scene; determining not to divide the image into a third number of patches based on the determining that the tool is detected in a patch of the second set of patches, wherein the third number of patches is greater than the second number of patches; and/or acquiring the image of the scene using a camera unit having two or more image sensors. In some embodiments the first number of patches is less than the second number of patches; the third number of patches is greater than the first number of patches and less than the second number of patches; performing object detection comprises: dividing a patch into a number of cells, and/or calculating a probability of a part of the tool being in a cell; the patches of the first set of patches and/or the second set of patches are rectangular; the patches of the first set of patches are equal in size; a first patch of the first set of patches is not equal in size to a second patch of the first set of patches; the tool is a first tool and the method further comprises detecting a second tool in the first set of patches; and/or the computer neural network is trained at a scale, and/or the scale is used for: performing object detection on the first set of patches, and/or performing object detection on the second set of patches.

In some embodiments, a memory device comprising instructions that cause one or more processors to perform the following steps for detecting a tool in a scene: obtain an image of the scene; divide the image into a first number of patches to generate a first set of patches, wherein a patch is an area of the image; perform object detection on the first set of patches to identify the tool in a patch of the first set of patches; determine that the tool is not detected in the first set of patches; divide the image into a second number of patches to generate a second set of patches, after determining that the tool is not detected in the first set of patches; perform object detection on the second set of patches to identify the tool in a patch of the second set of patches; and/or determine that the tool is detected in a patch of the second set of patches. In some embodiments, the memory device is part of a camera unit.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

While an interior of a building is being finished, connectors, anchors, and the like are attached to the floors, ceilings, and other structures in the building. Further, cuts are made and holes drilled using power saws and drills. Tools, such as special power tools, are used at predetermined locations, such that the tools are operated at numerous, precisely-defined positions in the building. For example, nail guns, power saws, powder anchor tools, and the like are used to nail, cut, install fasteners, and/or perform other operations at predetermined points within the building. In some buildings, a large number of electrical, plumbing, and HVAC components are sited and installed, usually with power tools. Additionally, finishing a building interior also uses a number of different tools that are not powered, which are also operated at precisely-defined positions, such as for example reinforcement bar scanners. Positioning both power tools and non-power tools quickly and with precision (e.g., with respect to surrounding walls, ceilings, and floors) can save time and reduce construction costs. In some embodiments, systems and/or methods are described to speed up, reduce manual labor, and/or reduce expense of construction.

Figure 1:
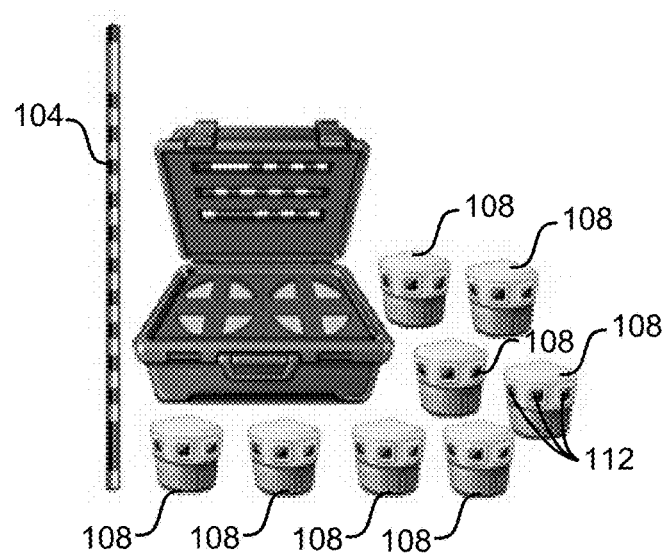
FIG. 1 depicts a simplified drawing of an embodiment of a camera system.

Referring first to FIG. 1, a simplified drawing of an embodiment of a camera system is shown. The camera system comprises camera units 108 and a main processing computer. The camera system comprises two or more camera units 108. In some embodiments, the camera system comprises two or more measurement sticks 104, and/or two or more main processing computers.

A camera unit 108 comprises a processor unit, a communication device, and/or one or more imaging devices 112 (e.g., two and/or three imaging devices 112). The imaging devices 112 have a position and/or orientation that is known relative to other imaging device(s) 112 and/or camera unit(s) 108. The imaging devices 112 acquire image sequences. The processor unit in the camera unit 108 processes the image sequences. The communication device transmits and receives data with the main processing computer.

Figure 2:
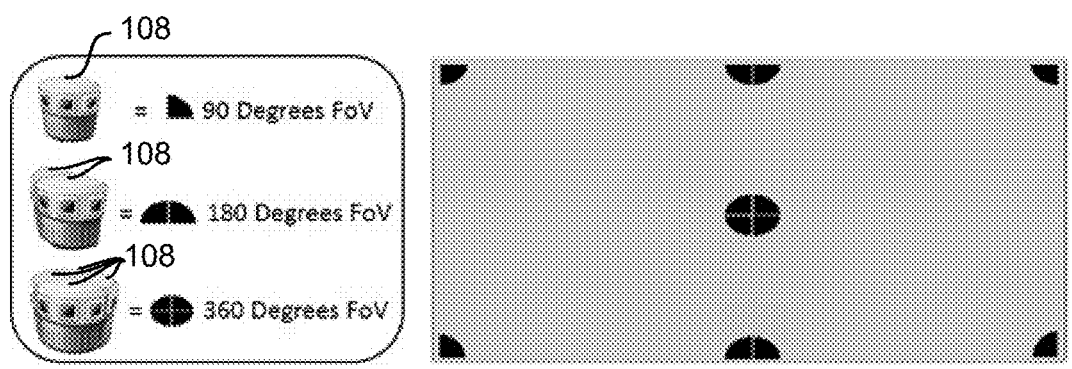
FIG. 2 depicts a simplified drawing of an embodiment of a configuration of camera units at a worksite.

In FIG. 2, a simplified drawing of an embodiment of a configuration of camera units 108 at a worksite is shown. An operator attaches camera units 108 to a column, wall, etc. The operator can add and/or subtract camera units 108 depending on a size of the worksite and/or a position of the camera unit 108.

Figure 3:
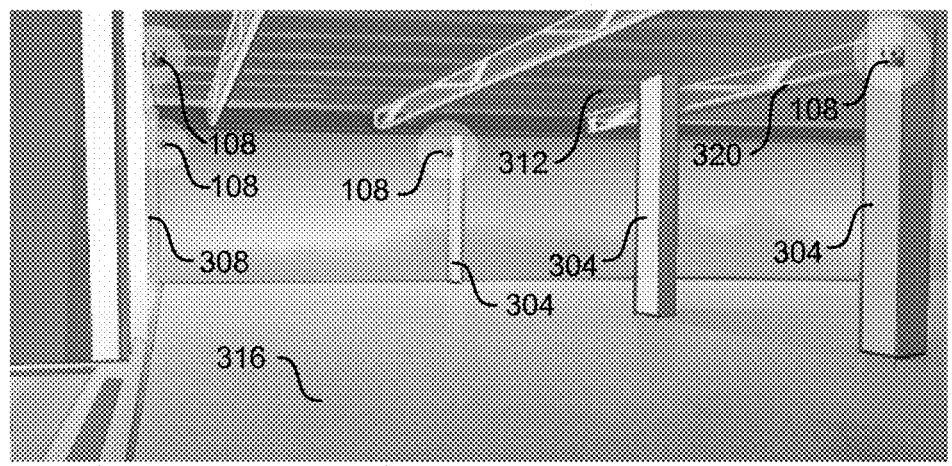
FIG. 3 depicts a simplified perspective drawing of an embodiment of camera units placed in a worksite.

FIG. 3 depicts a simplified perspective drawing of an embodiment of camera units 108 placed in a worksite. The operator attaches the camera units 108 to a column 304, wall 308, ceiling 312, floor 316, truss 320, etc. Camera units 108, which are modular, allow for quick setup.

Figure 4:
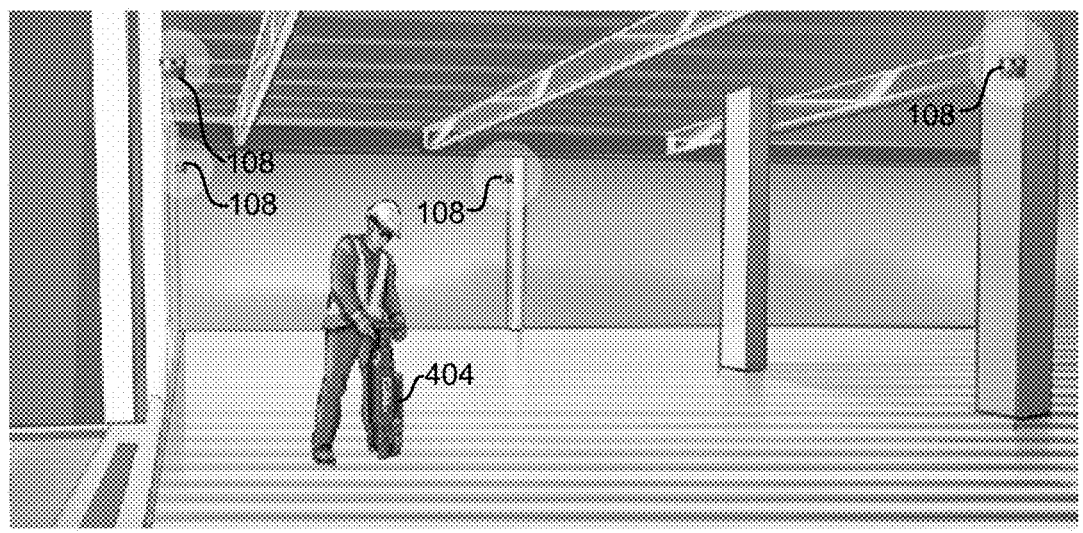
FIG. 4 depicts a simplified perspective drawing of an example of direct fastening on pan-decking.
Figure 5:
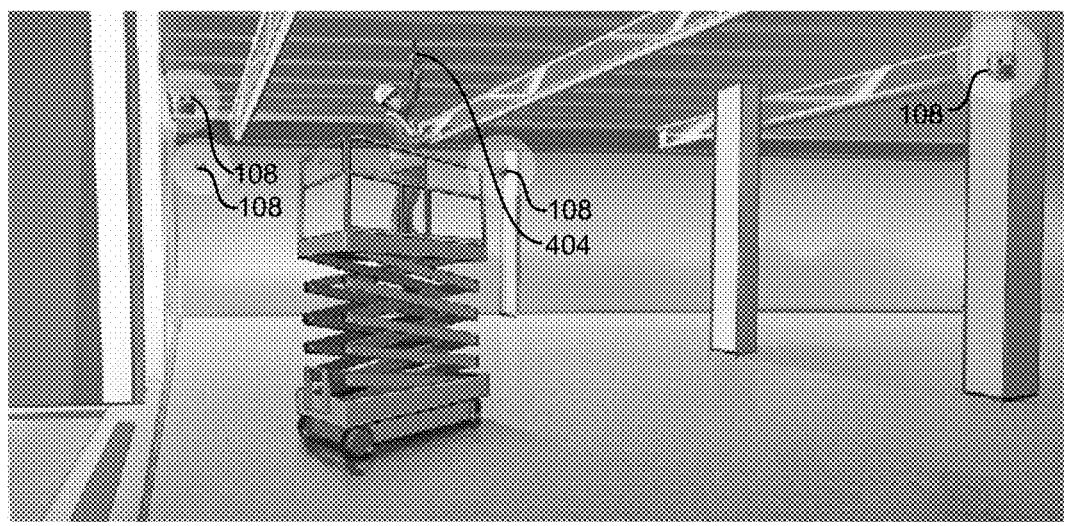
FIG. 5 depicts a simplified perspective drawing of an example of drilling and/or direct fastening on a ceiling while a user is on a scissor lift.

FIG. 4 depicts a simplified perspective drawing of an example of direct fastening on Pan-Decking. FIG. 5 depicts a simplified perspective drawing of an example of drilling and/or direct fastening on a ceiling while a user is on a scissor lift. The main computer processor is capable of finding and tracking various tools 404 (e.g., construction tools). System memory may include data defining a digital image and/or dimensions of each of a plurality of tools 404 so that the main computer processor can distinguish between the plurality of tools 404 used. In some embodiments, a position and/or orientation of a tool 404 is determined based on a recognition of an overall three-dimensional image of the tool 404 and/or on certain features of the tool 404. In some embodiments, certain features of the tool 404 are added to the tool 404 for a purpose of determining the position and/or orientation of the tool 404. In some embodiments, certain features of the tool 404 are built into the tool 404 for a purpose other than for determining the position and/or orientation of the tool 404.

Figure 6:
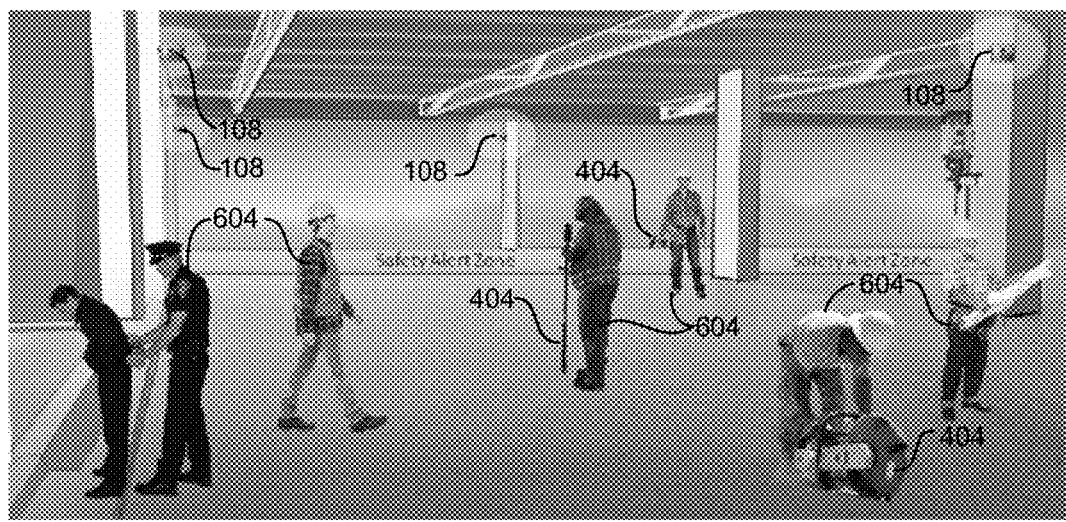
FIG. 6 depicts a simplified perspective drawing of an example of camera units used for personnel monitoring and/or tracking multiple tools.

FIG. 6 depicts a simplified perspective drawing of an example of camera units 108 used for monitoring personnel 604 and/or tracking multiple tools 404. In some embodiments, the main computer processor is configured to identify and track personnel 604. Thus camera units 108 can be used as a surveillance system for safety and/or security. In some embodiments, two or more tools 404 are tracked. Using the collinearity condition, such as described in the '169 Patent Application, two or more camera units 108 are used to acquire two or more images to calculate a three-dimensional position of the tool 404 based on images from the two or more camera units 108.

Figure 7:
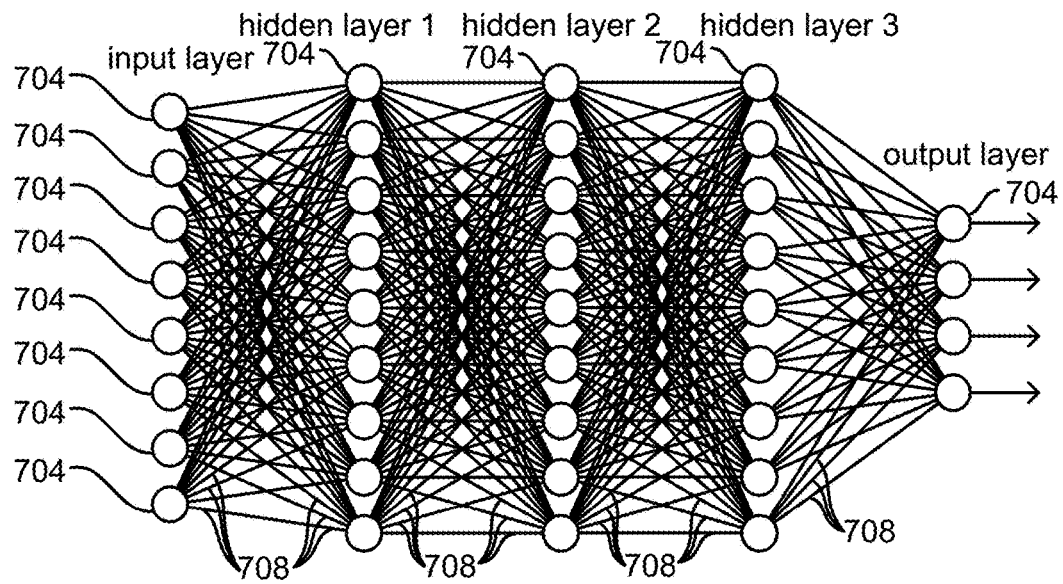
FIG. 7 depicts a simplified diagram of an embodiment of a neural network.

FIG. 7 depicts a simplified diagram of an embodiment of a computer neural network. Deep learning is inspired by simulating a nerve structure of a brain, as shown in FIG. 7. The computer neural network comprises nodes 704 and connectors 708. Not all nodes 704 and/or connectors 708 are identified with a number designator to reduce clutter in figures. The computer neural network comprises an input layer, one or more hidden layers, and an output layer. An output of a node 704 depends on one or more connections 708 to one or more nodes 704 in one or more previous layers and/or input(s). A connection weight, associated with a connection 708, decides contributions of the connection 708 to the computer neural network. In some embodiments a computer neural network is defined by its architecture and connection weights of connectors 708.

Figure 8:
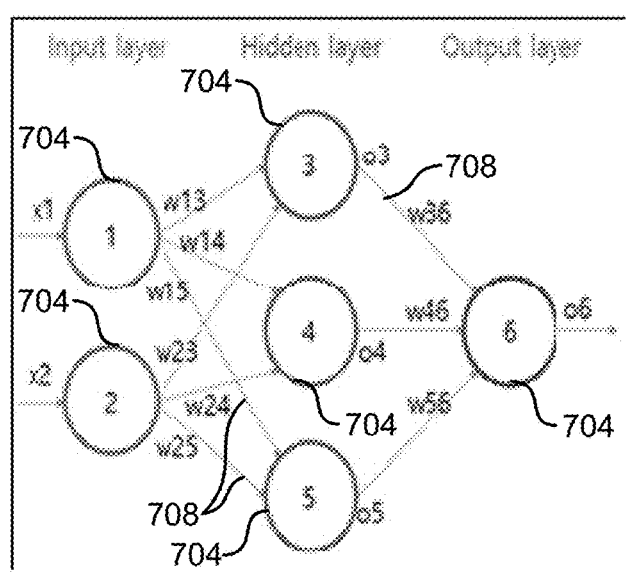
FIG. 8 depicts a simplified diagram of an embodiment of connections and weights in a neural network.

FIG. 8 depicts a simplified diagram of an embodiment of connectors 708 and weights in a computer neural network. The computer neural network is trained (e.g., before detecting a target in an image). Training is achieved by feeding the computer neural network a large set of examples to adjust weights of connectors 708, while making an output of the computer neural network close to values a user defines.

It may sound trivial to detect objects using classifying image patches selected from an image and determine which category objects belong to. However, image classification is complicated due to numerous image patches with different locations and scales. Even with help of generating potential candidate image patches, image classification has been slow.

In incremental training, a smaller dataset is used and incrementally updated with new observed data. In some embodiments, the computer neural network is trained to detect a target at once, not incrementally, such that all training data is used at once. In some embodiments, outputs of the computer neural network are treated as different categories, which represent different orientations of the target. After outputting a category, the network is fed the image patch again at the output location the category represents. In some embodiments, categories refer to labels used in training (e.g., different types of construction tools, human, etc.).

Figure 9:
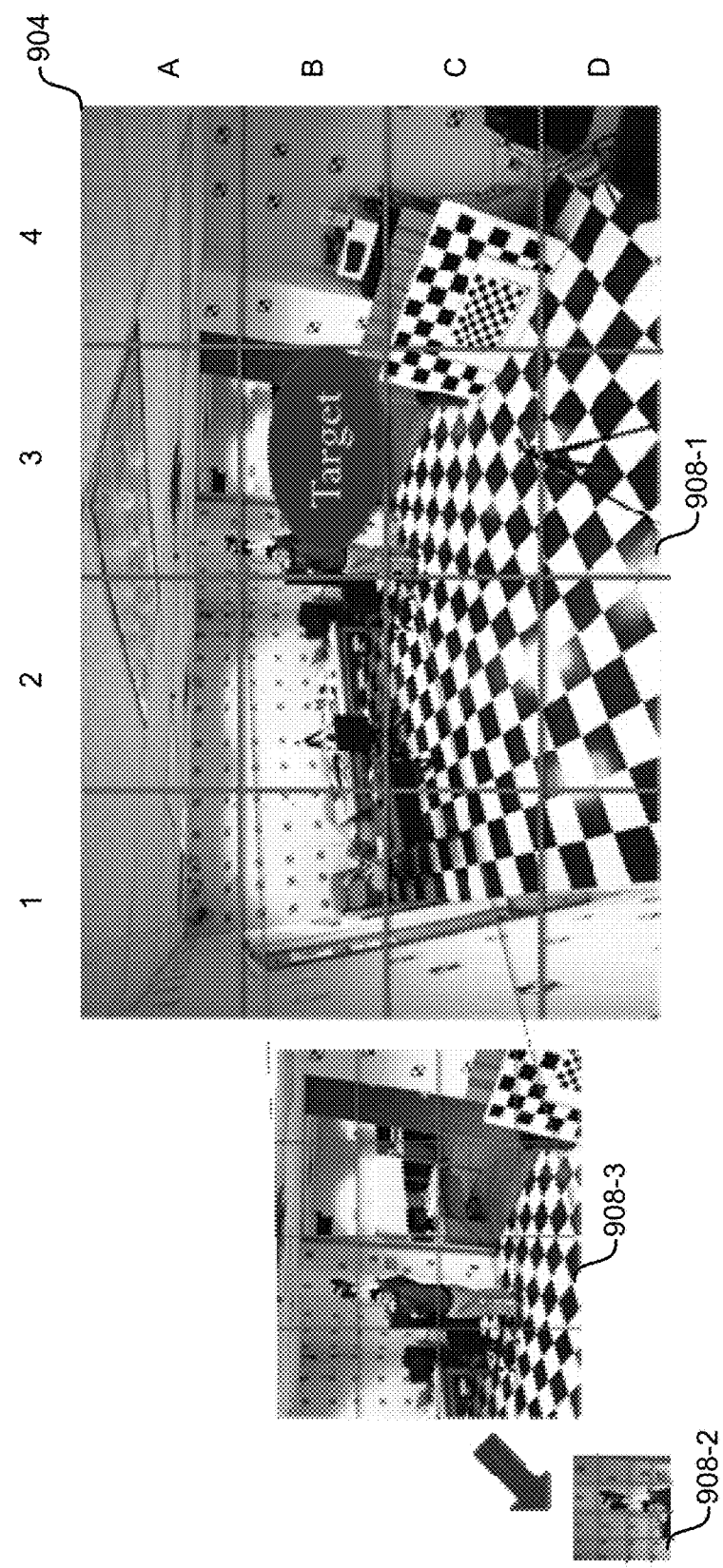
FIG. 9 depicts an embodiment of an image divided into patches.

FIG. 9 depicts an embodiment of an image divided into patches. Target location is refined by reducing sizes of patches from course to fine. FIG. 9 show an image 904 divided into a first number of patches to generate a first set of patches 908-1, a second number of patches to generate a second set of patches 908-2, and a third number of patches to generate a third set of patches 908-3. The first set of patches 908-1 are considered "course" (e.g., the first set of patches 908-1 has the largest patch size). The second set of patches 908-2 are considered "fine" (e.g., the second set of patches 908-1 has the smallest patch size). The third set of patches 908-3 is intermediary (in some embodiments there are more intermediary sets of patches, such as a fourth set of patches, a fifth set of patches, a sixth set of patches, and so on). The first number of patches is less than the second number of patches. The third number of patches (and other intermediary number of patches) is greater than the first number of patches and less than the second number of patches.

In some embodiments, patches of the first set of patches are of equal area. In the embodiment shown, the first number of patches is 16 (4×4) with quadrant rows labeled 1 through 4 and quadrant columns labeled A through D. In FIG. 9 each quadrant is one patch.

In some embodiments, patches of a set of patches are not equal in size. For example, if a previous image detected parts of the target in and/or near quadrants A2, A3, B2, and B3, then quadrants A2, A3, B2, and B3 could have different patch sizes than quadrants A1, A4, B1, B4, C1-C4, and D1-D4. So quadrants A1, A4, B1, B4, C1-C4, and D1-D4 could each have one patch a size of a quadrant, and quadrants A2, A3, B2, and B3 could be divided into patches similar to a patch size the target was detected in the previous image (e.g., quadrant A3 could be divided into 64 patches; and patch size could increase if the target is not identified in quadrant A3). In some embodiments, a target is tracked by a reference, such as a person (e.g., quadrants identified at and/or near a person have smaller or larger patch sizes based on a size of the person in the image; a size of a detected person providing an initial patch size for one or more quadrants with and/or adjacent to the person).

Figure 10:
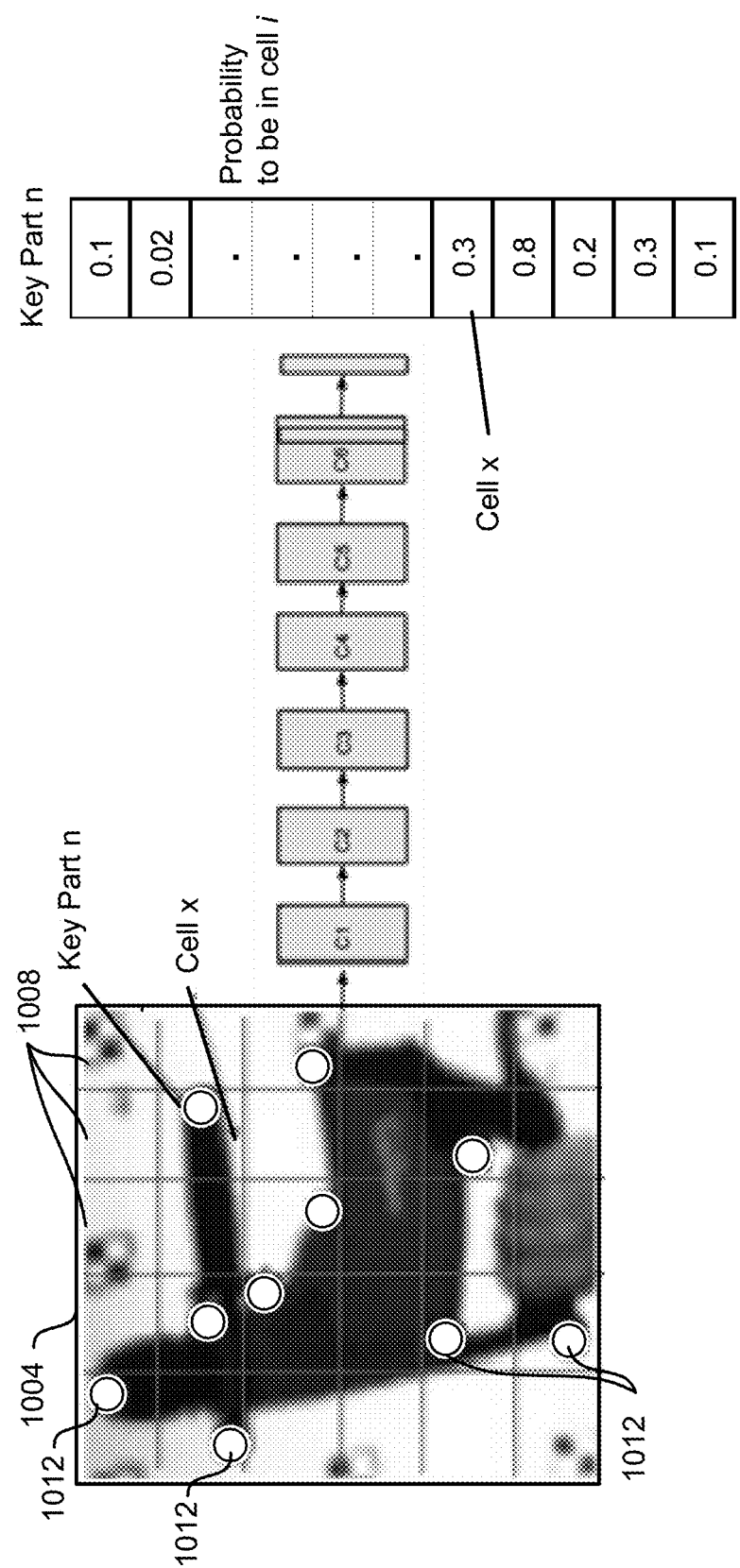
FIG. 10 depicts an embodiment of a patch divided into cells to identify parts of a target.

FIG. 10 depicts an embodiment of a patch 1004 divided into cells 1008 to identify parts of a target. To perform object detection, a patch 1004 is divided into cells 1008. Parts of a target, sometimes referred to as "key parts," 1012 are identified to localize the target. A key part is a part of a target to be identified to localize the target. In some embodiments, not all key parts of the target are identified in a given frame and/or in any frame. Probabilities of a key part located in a given cell 1008 are calculated. In some embodiments, probabilities of a target being in each cell 1008 are summed to equal one. By localizing the target in the image (a first image) and in a second image (e.g., acquired by a second camera unit 108), a three-dimensional position of the target can be calculated using the first image, the second image, and relative position and/or orientation between the first camera unit and the second camera unit. In some embodiments, outputs from the computer neural network calculate a probability of a given key part being in each cell. In some embodiments, a target's image is given as input to the computer neural network; the output is a probability of key parts in cells, with each cell representing a location of the target's image.

Figure 11:
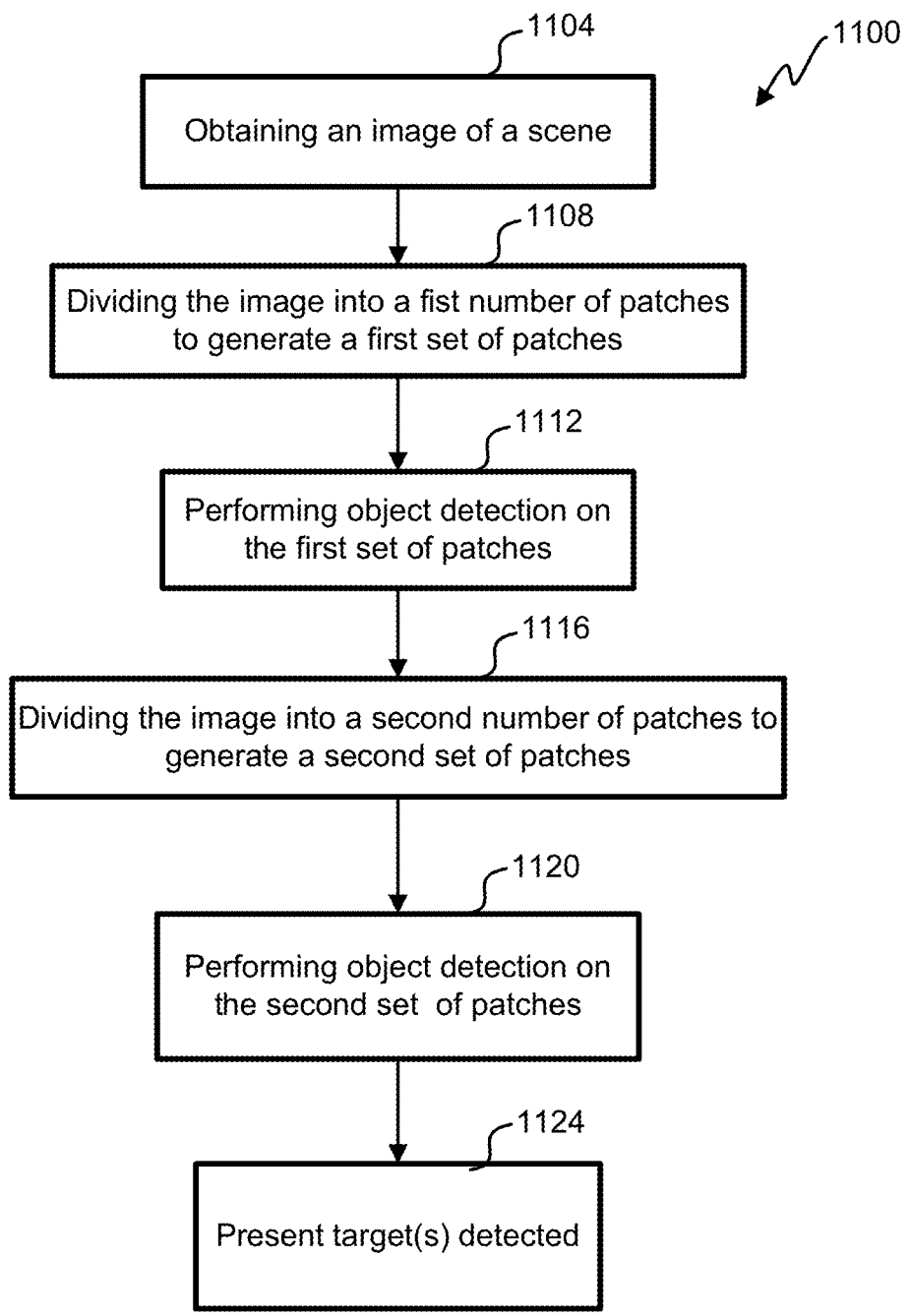
FIG. 11 illustrates a flowchart of an embodiment of a process for detecting a tool in a scene.

FIG. 11 illustrates a flowchart of an embodiment of a process 1100 for detecting a tool in a scene. Process 1100 begins in step 1104 with obtaining an image of a scene. In some embodiments, a camera unit 108 creates the image of the scene. The image is divided into a first number of patches to generate a first set of patches, step 1108. Object detection is performed on the first set of patches, step 1112, to identify a target (e.g., the tool). The image is divided into a second number of patches to generate a second set of patches, step 1116. Object detection is performed on the second set of patches to identify the target, step 1120. In step 1124, the target(s) detected is presented (e.g., on a display screen). In some embodiments, displaying the target detected is accomplished by displaying an indication of the target, such as using an overlay on the image. Examples of an indication of the target include text and/or graphics. In some embodiments, the indication is a heat map of a probable location of the tool, wherein the heat map is an overlay of the image.

In some embodiments, the first number of patches is less than the second number of patches. In some embodiments the first number of patches is equal to or greater than 4 and equal to or less than 64. In some embodiments, the image is divided into a third number of patches to generate a third set of patches. For example the image is divide into the third number of patches after dividing the image into the first number of patches and before dividing the image into the second number of patches. Object detection is performed on the third set of patches to identify a part of the tool in a patch of the third set of patches. It is determined that the tool is not detected in the third set of patches. The third number of patches is greater than the first number of patches and less than the second number of patches.

In some embodiments, a patch is divided into a plurality of cells for object detection, wherein a probability of a part of the target being in a cell of the plurality of cells is calculated. In some embodiments, the patch is rectangular. In some embodiments, patches of a set of patches are equal in size. In some embodiments, patches in a set of patches vary in size and/or shape (e.g., a first patch of the first set of patches is not equal in size and/or shape to a second patch of the first set of patches).

Figure 12:
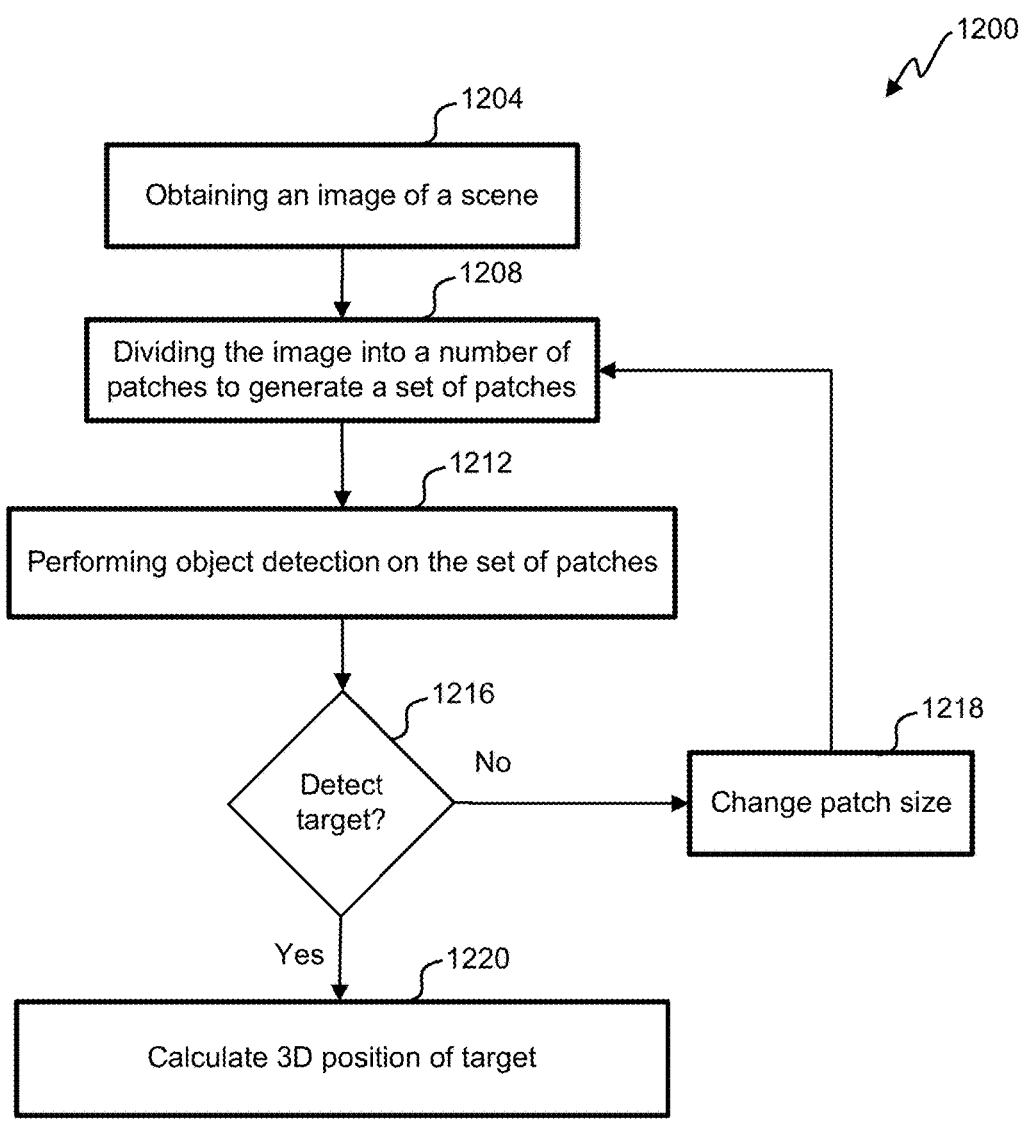
FIG. 12 illustrates a flowchart of an embodiment of another process for detecting a tool in a scene.

FIG. 12 illustrates a flowchart of an embodiment of a process 1200 for detecting a tool in a scene. Process 1200 begins in step 1204 with acquiring an image of a scene. In some embodiments, a camera unit 108 acquires the image of the scene by creating a video of the scene with multiple frames. In some embodiments, the tool is tracked in multiple image frames as the tool is moved around the worksite. In step 1208, the image is divided into a number of patches to generate a set of patches (e.g., a first set of patches). In step 1212, object detection is performed on the set of patches. In step 1216, a determination is made whether the target (e.g., the tool) is detected in the set of patches. If the target is not detected, then patch size is changed, step 1218 (e.g., reducing patch size by increasing the number of patches; or increasing patch size by reducing the number of patches) and the process returns to step 1208 dividing the image into a number of patches. In step 1216, after the target is detected, a three-dimensional position of the target is calculated based on a location of the target in the image (the image is a first image and the camera unit 108 is a first camera unit), and a location of the target in a second image (e.g., acquired from a second camera unit 108). In some embodiments, the second image is processed with a processor in the second camera unit 108 and the first image is processed with a processor in the first camera unit 1085. After processing, data is sent to a central processing unit so that bandwidth use of a network (e.g., a wireless network) can be reduced in comparison to sending image data to the central processing unit. In some embodiments, there are multiple targets, and steps 1208, 1212, and 1218 are repeated for levels of patch sizes from course to fine, regardless if a target was detected (e.g., finding a target in a patch of a set of patches does not necessarily end step 1218 to change patch size in process 1200).

Figure 13:
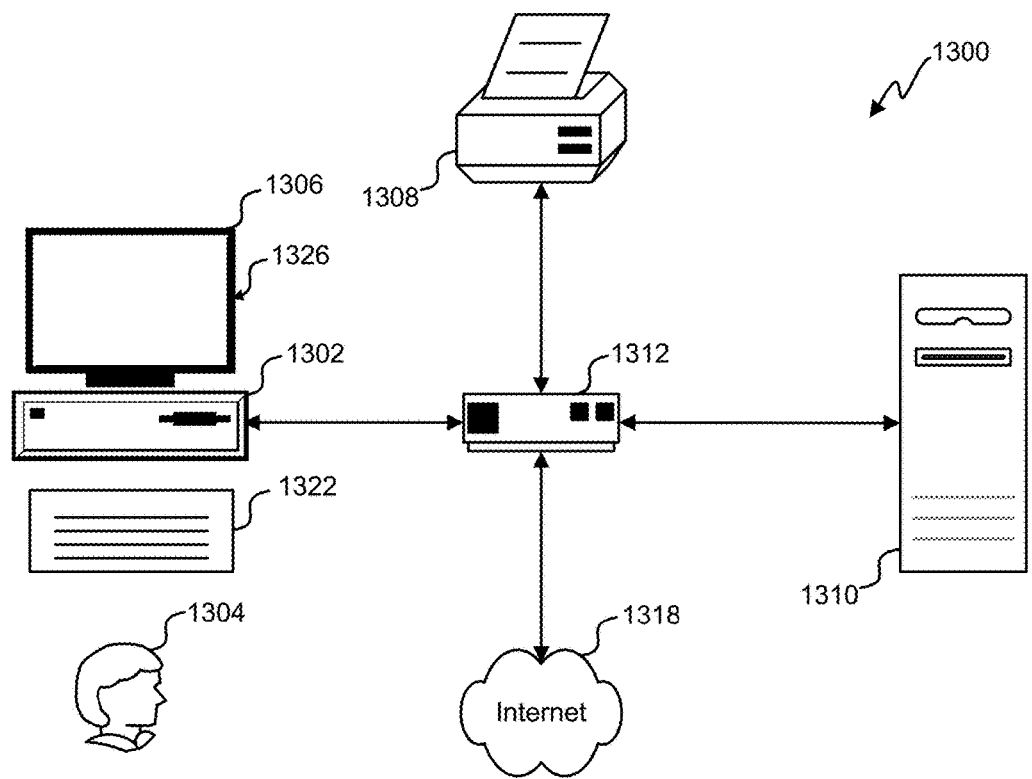
FIG. 13 depicts a block diagram of an embodiment of a computer system.

Referring next to FIG. 13, an exemplary environment with which embodiments may be implemented is shown with a computer system 1300 that can be used by a designer 1304 to design, for example, electronic designs. The computer system 1300 can include a computer 1302, keyboard 1322, a network router 1312, a printer 1308, and a monitor 1306. The monitor 1306, processor 1302 and keyboard 1322 are part of a computer system, which can be a laptop computer, desktop computer, handheld computer, mainframe computer, etc. The monitor 1306 can be a CRT, flat screen, etc.

A designer 1304 can input commands into the computer 1302 using various input devices, such as a mouse, keyboard 1322, track ball, touch screen, etc. If the computer system 1300 comprises a mainframe, a designer 1304 can access the computer 1302 using, for example, a terminal or terminal interface. Additionally, the computer 1302 may be connected to a printer 1308 and a server 1310 using a network router 1312, which may connect to the Internet 1318 or a WAN.

The server 1310 may, for example, be used to store additional software programs and data. In one embodiment, software implementing the systems and methods described herein can be stored on a storage medium in the server 1310. Thus, the software can be run from the storage medium in the server 1310. In another embodiment, software implementing the systems and methods described herein can be stored on a storage medium in the computer 1302. Thus, the software can be run from the storage medium in the computer 1302. Therefore, in this embodiment, the software can be used whether or not computer 1302 is connected to network router 1312. Printer 1308 may be connected directly to computer 1302, in which case, the computer system 1300 can print whether or not it is connected to network router 1312.

Figure 14:
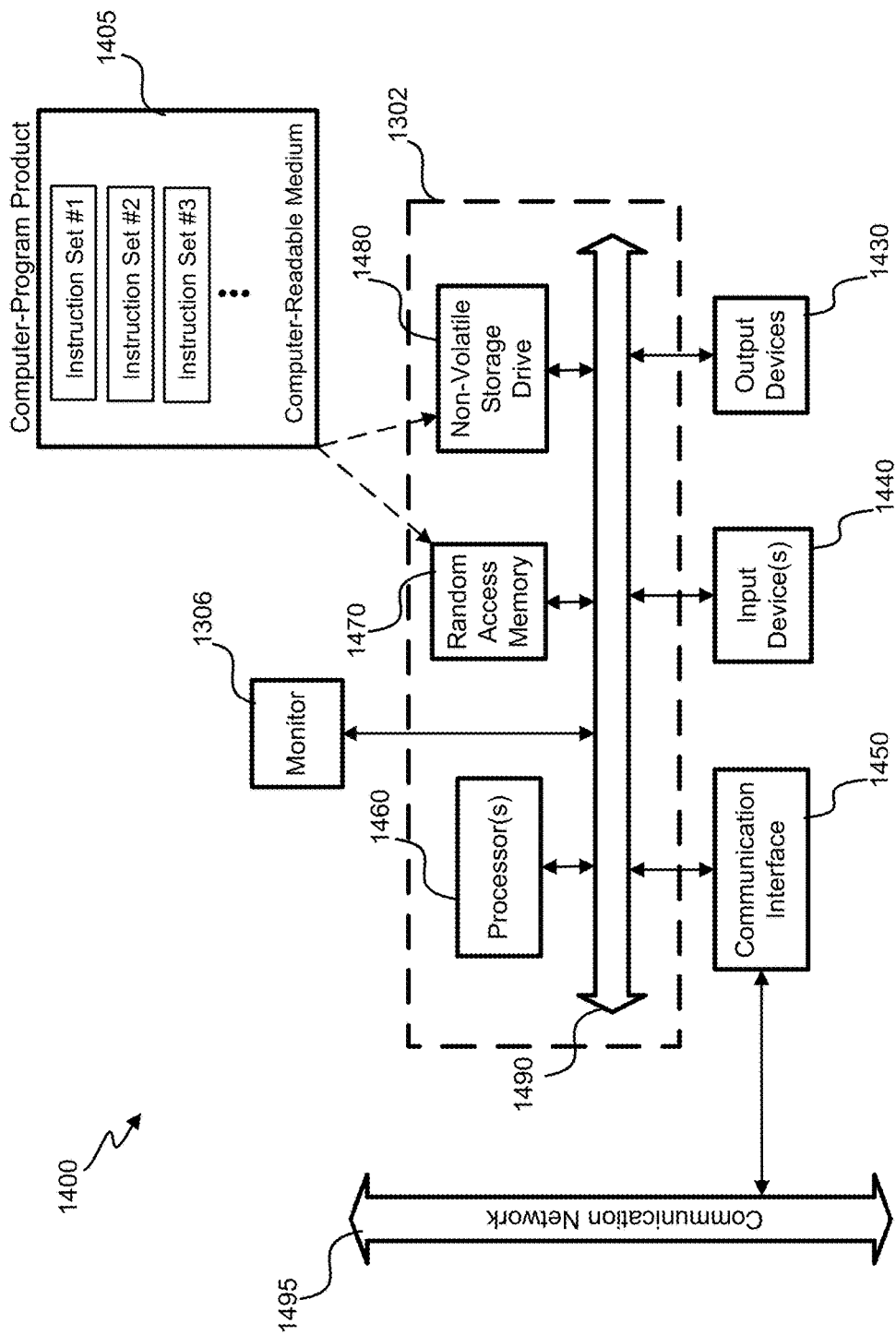
FIG. 14 depicts a block diagram of an embodiment of a special-purpose computer system.

With reference to FIG. 14, an embodiment of a special-purpose computer system 1400 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is transformed into the special-purpose computer system 1400.

Special-purpose computer system 1400 comprises a computer 1302, a monitor 1306 coupled to computer 1302, one or more additional user output devices 1430 (optional) coupled to computer 1302, one or more user input devices 1440 (e.g., keyboard, mouse, track ball, touch screen) coupled to computer 1302, an optional communications interface 1450 coupled to computer 1302, a computer-program product 1405 stored in a tangible computer-readable memory in computer 1302. Computer-program product 1405 directs system 1400 to perform the above-described methods. Computer 1302 may include one or more processors 1460 that communicate with a number of peripheral devices via a bus subsystem 1490. These peripheral devices may include user output device(s) 1430, user input device(s) 1440, communications interface 1450, and a storage subsystem, such as random access memory (RAM) 1470 and non-volatile storage drive 1480 (e.g., disk drive, optical drive, solid state drive), which are forms of tangible computer-readable memory.

Computer-program product 1405 may be stored in non-volatile storage drive 1480 or another computer-readable medium accessible to computer 1302 and loaded into memory 1470. Each processor 1460 may comprise a microprocessor, such as a microprocessor from Intel® or Advanced Micro Devices, Inc.®, or the like. To support computer-program product 1405, the computer 1302 runs an operating system that handles the communications of product 1405 with the above-noted components, as well as the communications between the above-noted components in support of the computer-program product 1405. Exemplary operating systems include Windows® or the like from Microsoft Corporation, Solaris® from Sun Microsystems, LINUX, UNIX, and the like.

User input devices 1440 include all possible types of devices and mechanisms to input information to computer 1302. These may include a keyboard, a keypad, a mouse, a scanner, a digital drawing pad, a touch screen incorporated into the display, audio input devices such as voice recognition systems, microphones, and other types of input devices. In various embodiments, user input devices 1440 are typically embodied as a computer mouse, a trackball, a track pad, a joystick, wireless remote, a drawing tablet, a voice command system. User input devices 1440 typically allow a user to select objects, icons, text and the like that appear on the monitor 1306 via a command such as a click of a button or the like. User output devices 1430 include all possible types of devices and mechanisms to output information from computer 1302. These may include a display (e.g., monitor 1306), printers, non-visual displays such as audio output devices, etc.

Communications interface 1450 provides an interface to other communication networks and devices and may serve as an interface to receive data from and transmit data to other systems, WANs and/or the Internet 1318. Embodiments of communications interface 1450 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1450 may be coupled to a computer network, to a FireWire® bus, or the like. In other embodiments, communications interface 1450 may be physically integrated on the motherboard of computer 1302, and/or may be a software program, or the like.

RAM 1470 and non-volatile storage drive 1480 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1470 and non-volatile storage drive 1480 may be configured to store the basic programming and data constructs that provide the functionality of various embodiments of the present invention, as described above.

Software instruction sets that provide the functionality of the present invention may be stored in RAM 1470 and non-volatile storage drive 1480. These instruction sets or code may be executed by the processor(s) 1460. RAM 1470 and non-volatile storage drive 1480 may also provide a repository to store data and data structures used in accordance with the present invention. RAM 1470 and non-volatile storage drive 1480 may include a number of memories including a main random access memory (RAM) to store of instructions and data during program execution and a read-only memory (ROM) in which fixed instructions are stored. RAM 1470 and non-volatile storage drive 1480 may include a file storage subsystem providing persistent (non-volatile) storage of program and/or data files. RAM 1470 and non-volatile storage drive 1480 may also include removable storage systems, such as removable flash memory.

Bus subsystem 1490 provides a mechanism to allow the various components and subsystems of computer 1302 communicate with each other as intended. Although bus subsystem 1490 is shown schematically as a single bus, alternative embodiments of the bus subsystem 1490 may utilize multiple busses or communication paths within the computer 1302.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. For example, steps in a processes (e.g., process 1100 and process 1200) can be interchanged and/or added to each other. Additionally, using different patch sizes can be used to detect targets, other than tools. For example, images could be processed to detect that correct parts are being installed correctly, such as for aircraft manufacturing and/or maintenance. Further, similar approaches can be used in convolution networks, residual networks, and other networks, not just computer neural networks.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A system for detecting a tool in a scene, the system comprising:
   a camera unit for acquiring an image of a scene; and
   one or more processors configured to:
   divide the image into a first number of patches to generate a first set of patches, wherein a patch is an area of the image, perform object detection on the first set of patches to identify the tool in a patch of the first set of patches,
determine that the tool is not detected in the first set of patches,
divide the image into a second number of patches to generate a second set of patches, after determining that the tool is not detected in the first set of patches,
perform object detection on the second set of patches to identify the tool in a patch of the second set of patches, and
determine that the tool is detected in a patch of the second set of patches.

2. The system as recited in claim 1, wherein the camera unit is a first camera unit, the one or more processors is a first processor unit, the image is a first image, and the system further comprises:
a second camera unit configured to acquire a second image, and
a second processor unit configured to determine a position of the tool in three dimensions based on the first image and the second image.

3. The system as recited in claim 1, further comprising a display, and the one or more processors is further configured to display an indication of the tool overlaying an image on the display.

4. The system as recited in claim 3, wherein the indication of the tool is a heat map.

5. A method for detecting a tool in a scene, the method comprising:
acquiring an image of the scene;
dividing the image into a first number of patches to generate a first set of patches, wherein a patch is an area of the image;
performing object detection on the first set of patches to identify the tool in a patch of the first set of patches;
determining that the tool is not detected in the first set of patches;
dividing the image into a second number of patches to generate a second set of patches, after determining that the tool is not detected in the first set of patches;
performing object detection on the second set of patches to identify the tool in a patch of the second set of patches; and
determining that the tool is detected in a patch of the second set of patches.

6. The method as recited in claim 5, wherein the first number of patches is less than the second number of patches.

7. The method as recited in claim 5, further comprising:
dividing the image into a third number of patches to generate a third set of patches, after determining that the tool is not detected in the first set of patches and before dividing the image into a second number of patches;
performing object detection on the third set of patches to identify the tool in a patch of the third set of patches; and
determining that the tool is not detected in the third set of patches.

8. The method as recited in claim 7, wherein the third number of patches is greater than the first number of patches and less than the second number of patches.

9. The method as recited in claim 5, wherein performing object detection comprises:
dividing a patch into a number of cells; and
calculating a probability of a part of the tool being in a cell.

10. The method as recited in claim 5, wherein the patches of the first set of patches and/or the second set of patches are rectangular.

11. The method as recited in claim 5, wherein the patches of the first set of patches are equal in size.

12. The method as recited in claim 5, wherein a first patch of the first set of patches is not equal in size to a second patch of the first set of patches.

13. The method as recited in claim 5, further comprising calculating a three-dimensional position of the tool based on the image from a first camera unit, wherein the image is a first image, and a second image from a second camera unit.

14. The method as recited in claim 5, wherein the tool is a first tool and the method further comprises detecting a second tool in the first set of patches.

15. The method as recited in claim 5, further comprising training a computer neural network to identify the tool before acquiring the image of the scene.

16. The method as recited in claim 15, wherein the computer neural network is trained at a scale, and the scale is used for:
performing object detection on the first set of patches, and
performing object detection on the second set of patches.

17. The method as recited in claim 5, further comprising determining not to divide the image into a third number of patches based on the determining that the tool is detected in a patch of the second set of patches, wherein the third number of patches is greater than the second number of patches.

18. The method as recited in claim 5, further comprising acquiring the image of the scene using a camera unit having two or more image sensors.

19. A memory device comprising instructions that cause one or more processors to perform the following steps for detecting a tool in a scene:
obtain an image of the scene;
divide the image into a first number of patches to generate a first set of patches, wherein a patch is an area of the image;
perform object detection on the first set of patches to identify the tool in a patch of the first set of patches;
determine that the tool is not detected in the first set of patches;
divide the image into a second number of patches to generate a second set of patches, after determining that the tool is not detected in the first set of patches;
perform object detection on the second set of patches to identify the tool in a patch of the second set of patches; and
determine that the tool is detected in a patch of the second set of patches.

20. The memory device as recited in claim 19, wherein the memory device is part of a camera unit.

* * * * *